United States Patent [19]
Fuerstenau et al.

[11] Patent Number: 5,910,253
[45] Date of Patent: Jun. 8, 1999

[54] REMOVAL OF METAL IONS FROM AQUEOUS SOLUTION

[75] Inventors: Maurice C. Fuerstenau, Reno, Nev.; Kangnian Zhong, Wuhan, China

[73] Assignee: The Board of Regents of the University and Community College System of Nevada, Reno, Nev.

[21] Appl. No.: 08/971,892

[22] Filed: Nov. 17, 1997

Related U.S. Application Data

[60] Provisional application No. 60/031,053, Nov. 18, 1996.
[51] Int. Cl.$^6$ .............................. B01D 15/00; C02F 1/28
[52] U.S. Cl. ............................................ 210/682; 210/688
[58] Field of Search .................................... 210/682, 688, 210/912, 913, 914

[56] References Cited

U.S. PATENT DOCUMENTS

| | | | |
|---|---|---|---|
| 3,890,225 | 6/1975 | Kajiyama | 210/38 |
| 4,671,882 | 6/1987 | Douglas et al. | 210/720 |
| 4,737,356 | 4/1988 | O'Hara et al. | 423/659 |
| 5,193,936 | 3/1993 | Pal et al. | 405/128 |
| 5,512,702 | 4/1996 | Ryan et al. | 588/256 |
| 5,665,240 | 9/1997 | Hong | 210/665 |
| 5,678,233 | 10/1997 | Brown | 588/2 |
| 5,681,447 | 10/1997 | Maycock et al. | 205/536 |

OTHER PUBLICATIONS

Klein, C. and Hurlbut, C.S. Jr., *Manual of Mineralogy*, 21st Ed. (1993), John Wiley & Sons, Inc. New York, pp. 434–435.

Sakaguchi, T., et al. (1993), "Recovery and Removal of Heavy Metal Elements such as Uranium by using Phosphate Compounds," (1933) in *Beneficiation of Phosphate: Theory and Practice*, H. El–Shall, et al., eds., Society for Mining, Metallurgy and Exploration, Littleton, CO, Chapter 44, pp. 469–478.

Suzuki, T. et al. (1980), "Synthetic Hydroxyapatites Employed as Inorganic Cation–exchangers," (1981) J. Chem. Soc. Faraday Trans. 77:1059–1062.

Suzuki, T., et al. (1984), "Synthetic Hydroxyapatites as Inorganic Cation Exchanges," J. Chem. Soc. Farady Trans. 80:3157–3165.

Takeuchi, Y., et al. (1988), "Study of Equilibrium and Mass Transfer in Processes for Removal of Heavy–metal Ions by Hydroxyapatite," (1988) J. Chem Eng. of Japan 21:98–100.

*Primary Examiner*—Ivars Cintins
*Attorney, Agent, or Firm*—Greenlee, Winner and Sullivan, P.C.

[57] ABSTRACT

A method for removing a selected heavy metal ion from an aqueous solution is provided herein. Said method comprises contacting the solution with collophane at a pH effective for capture of the selected heavy metal ion by the collophane. Heavy metal ions include $Sb^{2+}$, $As^{3+}$, $Cd^{2+}$, $Cr^{3+}$, $Co^{2+}$, $Cu^{2+}$, $Fe^{3+}$, $Pb^{2+}$, $Mn^{2+}$, $Hg^{2+}$, $UO_2^{2+}$ or $Zn^{2+}$, preferably $Fe^{3+}$, $Pb^{2+}$, and $Hg^{2+}$, $As^{3+}$ and $UO_2^{2+}$. The process is pH-sensitive and selective removal of desired heavy metal ions may be achieved by varying pH and other conditions to favor removal of the desired ions and leave other heavy metal ions whose removal is inhibited under such conditions in solution. Aqueous solutions suitable for use in this invention include leaching solutions and drainage solutions from mining operations, water supplies, slurries containing high concentrations of solids, bio-oxidation solutions from processes for gold or copper recovery, and any other solutions containing heavy metal ions whose removal is desired.

20 Claims, No Drawings

REMOVAL OF METAL IONS FROM AQUEOUS SOLUTION

CROSS-REFERENCE TO RELATED APPLICATIONS

This application claims priority from U.S. Provisional Application No. 60/031,053 filed Nov. 18, 1996, which application is incorporated herein to the extent not inconsistent herewith.

BACKGROUND OF THE INVENTION

The removal of heavy metal ions from waste solutions has received considerable study due to their toxic nature. Adsorption on solid substrates is one of the main techniques that has been studied. Substrates include inorganic substances such as alumina, ferric oxide and manganese oxide, and organic substrates such as various plants, e.g., algae and water hyacinth.

The control of ferric iron in metallurgical processing solutions is a major problem facing the industry, particularly in solutions obtained from biotreatment of iron-containing sulfide ores. In some instances, the concentration of ferric iron is 5–20 grams/liter. Use of conventional neutralization and/or precipitation techniques is inadequate and difficult to implement commercially.

The use of an acid phosphate salt, followed by pH adjustment and addition of a calcium source has been disclosed for making toxic metals such as lead, chromium, cadmium, arsenic, selenium, silver and barium less soluble in waste sludges. See U.S. Pat. No. 4,671,882 issued Jun. 9, 1987 to Douglas at al. for "Phosphoric Acid/Lime Hazardous Waste Detoxification Treatment Process." The use of phosphate materials has been disclosed for rendering lead and cadmium in solid wastes even more insoluble. See U.S. Pat. No. 4,737,356 issued Apr. 12, 1988 to O'Hara et al. for "Immobilization of Lead and Cadmium in Solid Residues from the Combustion of Refuse Using Lime and Phosphate." The use of solid calcium phosphate materials, e.g. gypsum powder, has been disclosed to fixate and stabilize leachable lead in toxic wastes. See U.S. Pat. No. 5,193,936 issued Mar. 16, 1993 to Pal et al. for "Fixation and Stabilization of Lead in Contaminated Soil and Solid Waste." Phosphorylated polysaccharides, chitin phosphate and chitosan phosphate have been disclosed as useful to adsorb heavy metal ions such as uranium. See Sakaguchi, T., et al. (1993), "Recovery and Removal of Heavy Metal Elements such as Uranium by using Phosphate Compounds," (1933) in *Beneficiation of Phosphate: Theory and Practice*, H. El-Shall, et al., eds., Society for Mining, Metallurgy and Exploration, Littleton, Colo., Chapter 44, p. 463.

The use of hydroxyapatite materials has been disclosed for removal of certain heavy metal ions from solution. For example, Suzuki, T., et al. (1980), "Synthetic Hydroxyapatites Employed as Inorganic Cation-exchangers," (1981) J. Chem. Soc. Faraday Trans. 77:1059–1062 discloses that ions such as $Cd^{2+}$, $Zn^{2+}$, $Ni^{2+}$, $Mg^{2+}$, and $Ba^{2+}$ are removed from aqueous solution by a mechanism involving ion exchange using synthetic hydroxyapatite. Lead ($Pb^{2+}$) was shown to be exchanged for $Ca^{2+}$ ions in aqueous solutions using synthetic hydroxyapatites. See Suzuki, T., et al. (1984), "Synthetic Hydroxyapatites as Inorganic Cation Exchanges," J. Chem. Soc. Farady Trans. 80:3157–3165; and Takeuchi, Y., et al. (1988), "Study of Equilibrium and Mass Transfer in Processes for Removal of Heavy-metal Ions by Hydroxyapatite," (1988) J. Chem Eng. of Japan 21:98–100. Solid calcium phosphate materials such as naturally-occurring apatite and synthetic hydroxyapatite have been disclosed as useful for in-situ immobilization of lead-contaminated soils, wastes and sediments by mixing with the lead-contaminated materials and leaving the mixture in place. See U.S. Pat. No. 5,512,702 issued Apr. 30, 1996 to Ryan, et al. for "Method for In-Situ Immobilization of Lead in Contaminated Silts, Wastes, and Sediments Using Solid Calcium Phosphate Materials." Hydroxyapatite has been disclosed as a useful component of filtering material for drinking water for removal of lead. See U.S. Pat. No. 5,665,240 issued Sep. 9, 1997 to Hong for "Point-of-Use Removal of Lead in Drinking Water Using Phosphate and Carbonate Minerals." Use of hydroxyapatite or a calcium depleted hydroxyapatite for immobilization of heavy metals in toxic waste materials has been disclosed. See U.S. Pat. No. 5,678,233 issued Oct. 14, 1997 to Brown for "Method of Immobilizing Toxic or Radioactive Inorganic Wastes and Associated Products." Hydroxyapatite has also been disclosed as useful or the removal of heavy metals from aqueous brine. See U.S. Pat. No. 5,681,447 issued Oct. 28, 1997 to Maycock, et al. for "Removal of Trace Metal and Metalloid Species from Brine."

Although hydroxyapatite materials have been known to be able to remove certain heavy metal ions from solution, their efficiency in doing so in view of their cost has precluded their use in many applications. A process using a less expensive, more efficient material is therefore needed.

SUMMARY OF THE INVENTION

A method for removing a selected heavy metal ion from an aqueous solution is provided herein. Said method comprises contacting the solution with collophane at a pH effective for capture of the selected heavy metal ion by the collophane.

Collophane (also called collophanite) is a massive, cryptocrystalline calcium phosphate constituting the bulk of phosphate rock and fossil bone. In physical appearance it is usually dense and massive with a concretionary or colloform structure. It is chemically similar to apatite but compared with commercially available conventional apatite particles in the same size range ($-147+104\mu$) the collophane has a specific surface area of 10.85 square meters per gram compared to 0.7 for apatite. Collophane is a naturally-occurring mineral which is usually impure, containing small amounts of calcium carbonate. It is an important constituent of the rock phosphorite or phosphate rock. Bone is calcium phosphate and large bodies of phosphorite are derived from the accumulation of animal remains as well as from chemical precipitation from seawater. Commercial deposits of phosphorite are found in northern France, Belgium, Spain, and especially in northern Africa in Tunisia, Algeria and Morocco. In the United States, high-grade phosphate deposits are found in Tennessee and Wyoming, Utah and Idaho, as well as the Atlantic Coast and Florida. It is a principal component of many fertilizers. Collophane is much less expensive than apatite, and is commercially available as of the time of this writing at about one cent per pound. Surprisingly, applicants have found it to be significantly more efficient than conventional apatite for removal of heavy metal ions from solution.

Collophane may be used as it occurs naturally, without removal of typical impurities. It may also be used without screening; however, to optimize the methods of this invention it may be desired to use only the smaller size fractions, e.g. less than about 1 mm, and preferably less than about 833 microns.

Heavy metals include antimony, arsenic, cadmium, chromium, cobalt, copper, iron, lead, manganese, mercury, nickel, uranium and zinc. Preferably the heavy metal ion removed from solution is $Sb^{2+}$, $As^{3+}$, $Cd^{2+}$, $Cr^{3+}$, $Co^{2+}$, $Cu^{2+}$, $Fe^{3+}$, $Pb^{2+}$, $Mn^{2+}$, $Hg^{2+}$, $UO_2{2+}$ or $Zn^{2+}$. A preferred class of such ions includes $Cd^{2+}$, $Cu^{2+}$, $Fe^{3+}$, $Pb^{2+}$, $Hg^{2+}$, and $Zn^{2+}$. A further preferred class of heavy metal ions includes $Fe^{3+}$, $Pb^{2+}$, and $Hg^{2+}$. Uranium ($UO_2^{2+}$) is also a preferred heavy metal ion for practicing the process of this invention. Arsenic ($As^{3+}$) and iron ($Fe^{3+}$) also form a preferred class of heavy metal ions for practicing the process of this invention. It has been found that the presence of ferric ions in solution with arsenic at at least about a 1:1 weight ratio, and preferably greater, e.g. about a 5:1 weight ratio of ferric to arsenic ions, allows for the removal of arsenic from solution. One or more heavy metal ions may be selected for removal in a particular process.

The process is pH-sensitive, with removal of certain heavy metal ions (e.g. lead ($Pb^{2+}$), iron ($Fe^{3+}$), arsenic ($As^{3+}$) and mercury ($Hg^{2+}$)), being favored at low pH (3.5 or less), and removal of certain other heavy metal ions (e.g. copper ($Cu^{2+}$), cadmium ($Cd^{2+}$), uranium ($UO_2^{2+}$) and zinc ($Zn^{2+}$)) being favored at neutral to slightly acidic pH (above 3.5 to 7). Selective capture of desired heavy metal ions may therefore be achieved by varying pH and/or other conditions in accordance with the teachings hereof to favor removal of the desired ions.

At low pH, e.g., about 2.5, using a solution containing a first selected heavy metal ion such as iron ($Fe^{3+}$) and a second unselected heavy metal ion such as uranium ($UO_2^{2+}$), iron would be selectively removed from solution, leaving uranium in solution. Selective removal means that a higher proportion of the selected heavy metal ion(s) is removed than the second unselected heavy metal ion(s). Such selective removal processes can be repeated to achieve separation of the selected and unselected heavy metal ions to desired levels.

Solutions containing mixtures of several different heavy metal ions can be treated for selective removal of selected ions by adjusting pH and other conditions as taught below. For example, at pH 3.5, in a solution containing lead ($Pb^{2+}$), iron ($Fe^{3+}$), arsenic ($As^{3+}$), mercury ($Hg^{2+}$), copper ($Cu^{2+}$), cadmium ($Cd^{2+}$), uranium ($UO_2^{2+}$), and zinc ($Zn^{2+}$), the first four ions will be preferentially removed, and proportionally more of the remaining ions will remain in solution. Finer separations may be achieved by further pH adjustments in accordance with the teachings hereof.

Uranium ($UO_2^{2+}$) is best removed at pH about 4–6.5, preferably about 5–6. A selective removal of uranium ($UO_2^{2+}$) as a selected heavy metal ion from solutions containing other heavy metal ions can be performed at pH about 6.5 to maximize uranium removal and inhibit removal of other heavy metal ions.

Selective capture of desired heavy metal ions may therefore be achieved by varying pH and other conditions in accordance with the teachings hereof to favor removal of the desired ions and leave other heavy metal ions whose removal is inhibited under such conditions in solution.

As shown in more detail below, removal of selected heavy metal ions may occur over a wide or relatively narrow pH range, depending on the ion. A pH effective for removal of a particular ion is one at which measurable removal occurs. Preferably, the amount of ion removed by the process of this invention will be sufficient to achieve the purposes for which the process is being carried out, e.g. removal to a particular environmentally or economically mandated level. In some instances maximization of removal will be desired, and in some embodiments removal down to environmentally mandated levels is preferably obtained. In other embodiments, it may only be necessary to remove a small fraction of the heavy metal ions present.

The solutions useful for the present process may contain large amounts of other impurities and be highly acidic or alkaline. pH adjustment may be necessary as taught herein; however, in general no pre-treatment of such solutions to remove impurities is required. Aqueous solutions suitable for use in this invention include leaching solutions and drainage solutions from mining operations, water supplies, slurries containing high concentrations of solids, bio-oxidation solutions from processes for gold or copper recovery, and any other solutions containing heavy metal ions whose removal is desired.

The process may be conducted by contacting the solution containing heavy metal ions with collophane in any way known to the art. For example, collophane may be added to such a solution, and the solution agitated or stirred. The solution may be essentially free of solids or may contain large concentrations of solids. For example, toxic heavy metals may be immobilized on solid wastes by wetting the wastes with a small amount of water or aqueous solution and mixing collophane therewith. Or solutions containing heavy metal ions may be trickled through a bed of collophane.

After removal of the heavy metal ions on the collophane, the collophane may be disposed of or, in the case of valuable ions, such may be recovered from the collophane by means known to the art.

Capture of the heavy metal ion by the collophane may occur by absorption, adsorption, ion exchange or any other mechanism known to the art. Capture of the heavy metal ion by collophane means removal of the heavy metal ion from solution. The term "attenuation" is also used herein to mean removal of the heavy metal ion from solution.

DETAILED DESCRIPTION

Collophane has been found to be an effective agent for removing heavy metal ions from solution. It has been found to be significantly more effective than hydroxyapatite. The pH of the solution may require adjustment as taught herein or as will be readily ascertainable to those skilled in the art without undue experimentation to effect the removal of selected ions. No heating is required. Generally about one to three hours of contact of the aqueous solution with the collophane is sufficient to achieve substantial removal of the selected heavy metal ion although, as taught below, longer periods of time, e.g., up to 24 hours or longer, may be useful. Over 90% removal of heavy metal ions is generally achievable. Parameters such as pH, conditioning time, collophane particle size and initial heavy metal ion concentration (or ratio of collophane to solution) should be optimized in accordance with the teachings hereof to achieve maximum heavy metal ion removal from solution. Reagents used for pH adjustment can be any reagents know to the art for this purpose; however, in some applications, it may not be desirable to precipitate the heavy metal ion as a salt of the reagent used, and reagents not forming precipitants with the heavy metal ions should be selected. For example, in bioleaching solutions, ferric ion may be precipitated as ferric hydroxide when calcium oxide is used for pH adjustment, which may be undesirable in downstream processing operations.

Although any collophane may be used in the processes of this invention, in general, collophane of lower particle sizes are preferred, e.g. about 833 microns or less. The amount of collophane required will depend on the concentration of heavy metal ion in the solution as will be appreciated by those skilled in the art; however about one gram of collophane has generally been found sufficient for the treatment of about 100 ml of solution, depending on the concentration of heavy metal ion in the solution. The attenuation capacity of collophane varies with the type of heavy metal ion removed, as is taught below and as will be readily ascertainable by those skilled in the art without undue experimentation.

The collophane may be added to the solution, preferably with continuous agitation during the period of contact, and separated from the solution after removal of heavy metal ions by means known to the art, e.g. centrifugation. Alternatively, the solution can be passed through a column of collophane. With ores that have been bioleached, for example, the collophane can be mixed with leached ore and introduced into a unit for solid/liquid separation, e.g., a thickener. Alernatively, the collophane can be combined with the ore prior to bioleaching.

It has been found that lead ($Pb^{+2}$) is most effectively removed from solution at low pH, i.e. over 90% removal, at pH values of about 2.5 to about 3.5, with better removal observed at pH 2.5 after one hour of contact; however, removals up to 99% are possible using three hours of contact time at higher pH, i.e., about 3.5. One gram of collophane per 100 ml of solution was found to be effective for treatment of solutions having concentrations up to about 2,600 mg/l of lead. In packed column experiments collophane was found to have an attenuation capacity for $Pb^{+2}$ of over 350 mg/g up to about 600 mg/g.

Iron ($Fe^{+3}$) is best removed at low pH, i.e. less than about 3. Better than 90% attenuation can be achieved. Further optimization experiments with bioleaching solutions, which have initial pH's below about 2, i.e., about 1.9, showed complete adsorption of ferric ion from solution after two hours contact with 5.0 g collophane in 75 ml de-ionized water containing 200 g wet ore. Attenuation is essentially independent of solids concentration of ore in the solution. Removal of ferric ion is more efficient than removal of ferrous ion.

Arsenic ($As^{3+}$) can also be removed from solutions using collophane at low pH, e.g. around 2; however the presence of ferric ion appears to be necessary, and long contact times, e.g. about 24 hours, are recommended.

Mercury ($Hg^{2+}$) is also most effectively removed at low pH, e.g. around 2–6, and preferably about 3. Greater than 90% attenuation has been achieved, with residual mercury concentrations less than 1 ppm and down to less than about 0.05 ppm.

Copper ($Cu^{2+}$) was found to be effectively removed from solutions down to 0.9 ppm (starting with a concentration of 8.3 ppm) at pH 6, achieving close to 90% attenuation, i.e 89.2%.

Cadmium ($Cd^{+2}$) has also been removed from solution at better than 90% attenuation. Best removal is achieved at pH greater than about 4.5, preferably about 6.5 and initial concentration less than about 5.5 ppm using one hour of conditioning time.

Uranium ($UO_2^{2+}$), has been found to be effectively removed from solution at neutral to slightly acidic conditions, i.e. about 3.5 to about 7. Uranium was removed down to a concentration of 18.7 ppb using two grams of collophane per 100 ml of solution having an initial concentration of uranium of 70 ppm at pH 6.5.

Zinc ($Zn^{2+}$) was also effectively removed to greater than 90% attenuation at around neutral pH, although removal also occurs down to pH about 4. Best percent attenuation was obtained using solutions having low, e.g. less than about 25 ppm, concentrations.

The methods of this invention can be used for separation of heavy metal ions in solutions by varying conditions to favor removal of a selected heavy metal ion and inhibit removal of a second heavy metal ion. For example, using low pH, e.g. about 3.5 or less, allows selective removal of heavy metal ions requiring low pH for best removal, e.g., lead ($Pb^{2+}$), iron ($Fe^{3+}$), arsenic ($As^{3+}$) and mercury ($Hg^{2+}$), from solutions which also contain heavy metal ions requiring higher pH, copper ($Cu^{2+}$), cadmium ($Cd^{2+}$), uranium ($UO_{22+}$), and zinc ($Zn^{2+}$). In addition, uranium ions can be separated from many other heavy metals by further raising the pH to around 6.5.

EXAMPLES

Experiments were conducted by placing a specified amount of collophane (commercially available calcium fluorophosphate from Florida) in 100 ml of aqueous solution containing the specified initial metal ion concentrations at the specified pH. The pH was adjusted with either NaOH or $HNO_3$, and the temperature was controlled at 23° C. The suspensions were stirred for the stated amount of time, after which the solids were separated from their respective solutions by centrifuging at 5000 rpm for 6 minutes. The metal ion concentrations in the separated solutions were then determined analytically.

Example 1

Attenuation of Lead.

Lead acetate was used as the source of $Pb^{2+}$ for the experimental work. The parameters investigated were:

1. Effect of pH;
2. Effect of conditioning time;
3. Effect of collophane size; and
4. Effect of $Pb^{2+}$ concentration.

System 1. Effect of pH

The effect that pH exhibits was examined and values of pH were varied from 2.5 to 5.5. As the results presented in Table 1 show, effective remediation of $Pb^{2+}$ occurs only in quite acid conditions. About 93% attenuation was attained at pH 2.5. Attenuation is achieved by the ion exchange of $Pb^{2+}$ for $Ca^{2+}$.

TABLE 1

The Effect of pH
Conditions: 1 g collophane (−104 + 74μ); initial lead concentration: 796 mg/l; 100 ml solution; 1 hour conditioning time.

| pH | Initial Conc. of Pb, ppm | Residual Conc. of Pb, ppm | Attenuated Pb, mg/g | Attenuation, % |
|---|---|---|---|---|
| 2.5 | 796 | 57 | 73.9 | 92.8 |
| 3.5 | 796 | 302 | 52.6 | 63.5 |
| 4.5 | 796 | 590 | 20.6 | 25.9 |
| 5.5 | 796 | 528 | 26.8 | 33.7 |

System 2. Effect of conditioning time.

The effect that conditioning time has on attenuation was also investigated. See Table 2. For this series of experiments, an initia $Pb^{2+}$ concentration of about 800 mg/l and pH 3.5 were selected. As the conditioning time is increased, the attenuation of $Pb^{2+}$ was increased. After three hours of conditioning, about 99% of the $Pb^{2+}$ was removed from solution.

TABLE 2

Effect of conditioning time.
Conditions: 1 g collophane (−104 + 74μ); initial lead concentration:
828 mg/l 100 ml solution; pH 3.5

| Conditioning Time, min | Initial Conc. mg/l | Residual Conc. mg/l | Attenuated Pb mg/g | Attenuation % |
|---|---|---|---|---|
| 15 | 828 | 445 | 38.3 | 46.3 |
| 30 | 828 | 435 | 39.3 | 47.5 |
| 60 | 828 | 302 | 52.6 | 63.5 |
| 120 | 828 | 78 | 75.0 | 90.6 |
| 180 | 828 | 11 | 81.7 | 98.7 |

System 3. Effect of particle size.

The effect of particle size was examined with $Pb^{2+}$ attenuation experiments. As shown in Table 3, attenuation is essentially independent of size of collophane within the size range, −833+74μ. When the collophane is coarser than 833μ, however, attenuation is reduced.

TABLE 3

The effect of size of collophane.
Conditions: 1 g collophane; 100 ml of solution;
3 hour conditioning time; pH 2.5.

| Size microns | Initial Conc. mg/l | Residual Conc. mg/l | Attenuated Pb mg/g | Attenuation % |
|---|---|---|---|---|
| −1651 + 833 | 1595 | 1446 | 14.9 | 9.3 |
| −833 + 295 | 1772 | 33.5 | 173.8 | 98.1 |
| −295 + 147 | 1772 | 42.0 | 173.0 | 97.6 |
| −147 + 105 | 1772 | 42.0 | 173.0 | 97.6 |
| −104 + 74 | 1772 | 45.5 | 172.6 | 97.4 |

System 4. Effect of $Pb^{2+}$ concentration.

The concentration of $Pb^{2+}$ was varied from 758 to 3,111 mg/l at pH 2.5. About 98% of the $Pb^{2+}$ was attenuated up to about 2,600 mg/l which is shown in Table 4. Above about 2,800 mg/l $Pb^{2+}$, attenuation was noted to decrease under these conditions.

TABLE 4

Effect of $Pb^{2+}$ concentration.
Conditions: 1 g collophane (−104 + 74μ); 100 ml solution
3 hour conditioning time; pH 2.5.

| Initial Conc. mg/l | Residual Conc. mg/l | Attenuated Pb mg/g | Attenuation % |
|---|---|---|---|
| 758 | 22.5 | 73.5 | 97.0 |
| 1313 | 22.4 | 129.0 | 98.2 |
| 1772 | 42.0 | 173.0 | 97.6 |
| 1929 | 22.0 | 190.7 | 98.8 |
| 2583 | 38.8 | 254.4 | 98.5 |
| 2822 | 446 | 237.6 | 84.4 |
| 3050 | 872 | 217.8 | 71.4 |
| 3111 | 833 | 227.8 | 73.2 |

Column as a plug flow reactor.

A column was set up, 66 cm high, 0.91 $cm^2$ cross section area; 70.0 gram collophane (−833+295μ) 30.0 $cm^3$ vacancy, initial $Pb^{2+}$ concentration 640 ppm; pH 2.5; flow rate 1.46 $cm^3$/min; calculated contact time 20.5 min.

When the initial $Pb^{2+}$ concentration was 640 ppm, a $Pb^{2+}$ attenuation capacity of 365 mg/g of collophane was obtained, and the $Pb^{2+}$ concentration of the effluent was 0.3 ppm. With a prolonged time, a capacity of 575 mg/g was achieved with a $Pb^{2+}$ ion concentration of about 4 ppm in the effluent.

Example 2

Attenuation of Cadmium.

Adsorption experiments were conducted with cadmium nitrate as a function of pH and cadmium ($Cd^{2+}$) concentration.

System 1. Effect of pH.

TABLE 5

Attenuation of $Cd^{2+}$
Conditions: 1 g collophane (−147 + 104μ); initial cadmium
concentration: 120 ml solution; 1 hour conditioning time.

| pH | Residual Conc. of Cd, ppm | Attenuation % |
|---|---|---|
| 2.0 | 81 | 33 |
| 4.5 | 60 | 50 |
| 5.5 | 58 | 52 |
| 6.5 | 57 | 53 |

Attenuation of cadmium ion is effected with collophane, especially when the pH is greater than about 4.5

System 2. Effect of initial concentration.

1 gram collophane (−147+104μ); 100 $cm^3$ solution; 1 hour conditioning time; pH 5.5.

TABLE 6

| Initial Conc. of Cd, ppm | Residual Conc. of Cd, ppm | Attenuation % |
|---|---|---|
| 0.22 | 0.005 | 97.7 |
| 0.55 | 0.012 | 96.8 |
| 1.1 | 0.038 | 96.7 |
| 2.2 | 0.076 | 96.5 |
| 5.5 | 0.45 | 91.8 |
| 10 | 1.4 | 86.0 |
| 27 | 7 | 74.9 |
| 62 | 32 | 48.4 |
| 86 | 33 | 61.6 |
| 102 | 36 | 64.7 |

Greater than 90% attenuation was obtained when the initial concentration of cadmium was lower than 5–10 ppm, at pH 5.5.

Example 3

Attenuation of Iron.

Experiments were conducted to establish the extent of attenuation of $Fe^{3+}$ by collophane.

System 1.

Initial concentration of ferric sulfate 560 ppm; 1 gram of collophane; 100 $cm^3$ solution; 2 hours conditioning time.

TABLE 7

| pH | Initial Conc. of $Fe^{3+}$, ppm | Residual Conc. of $Fe^{3+}$, ppm | Attenuated $Fe^{3+}$, mg/g | Attenuation % |
|---|---|---|---|---|
| 1.8 | 560 | 52 | 50.8 | 90.3 |
| 2.3 | 560 | 62 | 49.8 | 88.9 |

Collophane attenuates $Fe^{3+}$ very effectively in acid medium, preferably below about pH 3.

System 2. Hydrometallurgical Solution.

Initial pH 1.15; solution contained 7.4 g $Fe^{3+}$/l and 2.7 g Ni/l; 2 gram collophane (−147+104μ); 1 hour conditioning time; CaO used a pH modifier; attenuation experiments conducted at pH 1.8.

TABLE 8

|  | Residual Conc. of $Fe^{3+}$, g/l | Residual Conc. of Ni, g/l | Attenuation of $Fe^{3+}$, % |
|---|---|---|---|
| Collophane | 2.2 | 2.6 | 70.3 |
| Blank (without collophane) | 4.2 | 2.7 | 43.2 |

Collophane attenuates about 70% of Fe from this solution at pH 1.8 with very little or no attenuation of Ni. A capacity of about 100 mg Fe/g collophane (referring to the blank) was established.

Example 4

Attenuation of Uranium.

Collophane is an excellent adsorbent of dissolved uranium; two systems have been studied.

System 1.

Standard solution (Aldrich Chemical Company); uranium concentration was 70 ppm; 1 gram collophane ($-147+104\mu$); 100 cm$^3$ solution; 1 hour conditioning time.

TABLE 9

| pH | Residual Conc. of U, ppm | Attenuation of U, % |
|---|---|---|
| 3.0 | 10.9 | 84.3 |
| 4.0 | 0.3 | 99.6 |
| 5.0 | 0.2 | 99.7 |
| 6.0 | 0.1 | 99.8 |

System 2. Uranium contaminated soil leached with sodium carbonate.

In another series of experiments a uranium-contaminated soil was leached with sodium carbonate. For the remediation experiments, the initial uranium concentration was 4.3 mg/l, and the pH was 9.5. These results are shown in Table 10; as shown, no attenuation was achieved at pH 9.5 whereas essentially complete attenuation was experienced at pH 6.5. When two grams of collophane were used with a conditioning time of three hours with a solution containing the same concentration of uranium at pH 6.5, a residual uranium concentration of 18.7 ppb was measured.

TABLE 10

| pH | Residual Conc. of U, ppm | Attenuation of U, % |
|---|---|---|
| 9.5 | 4.3 | 0 |
| 8.5 | 4.2 | 2.3 |
| 7.5 | 3.1 | 27.9 |
| 6.5 | 0.1 | 97.6 |

Example 5

Attenuation of Mercury.

Attenuation experiments were conducted with mercuric nitrate as a function of concentration and pH.

System 1.

Attenuation experiments were conducted with mercuric nitrate as a function of pH. The initial $Hg^{2+}$ concentration was 42.8 mg/l. Optimal pH for adsorption and attenuation was found to be about pH 3.0. See Table 11.

TABLE 11

Attenuation of mercury.
Conditions: 1 g collophane ($-147 + 104\mu$); initial mercury concentration: 42.8 mg/l 100 ml solution; 1 hour conditioning time

| pH | Residual Conc. of Hg, ppm | Attenuation of Hg, % |
|---|---|---|
| 2.0 | 18.1 | 57.7 |
| 2.5 | 9.8 | 77.1 |
| 3.0 | 5.1 | 88.1 |
| 4.0 | 13.9 | 67.5 |
| 5.0 | 23.5 | 45.1 |
| 6.0 | 29.4 | 31.3 |

System 2.

pH 3.0; 1 gram collophane; 100 cm$^3$ solution; 1 hour conditioning time.

TABLE 12

| Initial Conc. of Hg, ppm | Residual Conc. of Hg, ppm | Attenuation of Hg, % |
|---|---|---|
| 0.54 | 0.042 | 92.2 |
| 1.1 | 0.087 | 92.1 |
| 2.2 | 0.24 | 89.1 |
| 4.3 | 2.7 | 37.2 |
| 10.7 | 4.3 | 59.2 |
| 21.4 | 7.0 | 67.2 |
| 34.2 | 7.3 | 78.8 |
| 51.4 | 8.2 | 74.9 |

Attenuation of $Hg^{2+}$ is obtained from pH 2 to 6. Preferably pH is about 3.0.

Example 6

Attenuation of Zinc.

Attenuation experiments were conducted with zinc nitrate as a function of concentration and pH.

System 1.

Attenuation experiments were conducted with zinc nitrate as a functon of concentration and pH. Very little attenuation was experienced in acid medium, but about 70% of the $Zn^{2+}$ was attenuated at pH 7.0 (Table 13). With lower $Zn^{2+}$ concentrations, e.g., 10 to 20 mg/l, about 90% attenuation was achieved.

TABLE 13

Attenuation of $Zn^{2+}$.
Conditions: 1 g collophane ($-147 + 104\mu$); initial zinc concentraiton: 80 mg/l; 100 ml solution; 1 hour conditioning time.

| pH | Residual Conc. of Zn, ppm | Attenuation of Zn, % |
|---|---|---|
| 4.0 | 79.6 | 5.0 |
| 5.0 | 69.5 | 13.1 |
| 6.0 | 57.6 | 28.0 |
| 7.0 | 22.8 | 71.5 |

System 2.

pH 7.0; 1 gram collophane; 100 cm$^3$ solution; 1 hour conditioning time.

TABLE 14

| Initial Conc. of Zn, ppm | Residual Conc. of Zn, ppm | Attenuation of Zn, % |
|---|---|---|
| 11 | 0.6 | 94.4 |
| 22 | 1.7 | 92.3 |
| 45 | 15.2 | 66.2 |
| 67 | 20.7 | 69.1 |
| 80 | 22.8 | 71.5 |

Zinc ion is attenuated about pH 4. The preferred pH for attenuation is about pH 7.0.

Example 7
Attenuation of Copper.

Experiments on the attenuation of copper were conducted with cupric sulfate. The results indicate that when the initial concentration of $Cu^{2+}$ was 25.6 ppm at pH 6.0 (calculated concentration was 8.3 ppm because the solubility product of $Cu(OH)_2$ is $1.3 \times 10^{-20}$), the residual concentration of $Cu^{2+}$ was 0.9 ppm. Attenuation of copper was 89.2%.

Example 8
Removal of Ferric Ion from Bio-oxidized ore.

About 55 pounds of bio-oxidized gold ore was provided. The size distribution of 1000 g of wet ore was determined after 15 minutes of screening. See Table 15.

TABLE 15

Size distribution of wet ore.

| Size (mm) | Wet Weight (g) | Percent (%) |
|---|---|---|
| +18.85 | 185.73 | 18.65 |
| −18.85 + 12.50 | 245.65 | 24.67 |
| −12.50 + 8.00 | 231.54 | 23.25 |
| −8.00 + 3.35 | 14.22 | 1.43 |
| −3.35 | 14.22 | 1.43 |
| Total | 995.74 | 100.00 |

The wet ore of different size ranges was dried to determine moisture content. These results are shown in Table 16.

TABLE 16

Moisture content of wet ore.

| Size (mm) | Wet Weight (g) | Dry Weight (g) | Moisture Content (%) |
|---|---|---|---|
| +18.85 | 185.73 | 181.69 | 2.18 |
| −18.85 + 12.50 | 245.65 | 235.02 | 4.33 |
| −12.50 + 8.00 | 231.54 | 219.87 | 5.04 |
| −8.00 | 332.82 | 311.06 | 6.54 |
| Total | 995.74 | 947.64 | 4.83 |

Wet ore, −12.50 mm in size, was selected for further experiments, since its weight percentage is about 55%, and its moisture content is about 6.0%.

1. Effect of Adsorption Time.

200 g of wet ore and 75 ml of de-ionized water were placed into a plastic bottle. Then, 5.0 g of collophane (−104+74μ) was added, and the bottle was turned for predetermined times. Initial $Fe^{3+}$ concentration was 5.0 g/L. Thee results are presented in Table 17. As shown, essentially complete adsorption is effected after two hours of contact under these conditions.

TABLE 17

Effect of adsorption time.
Conditions: 200 g wet ore (−12.5 mm); 75 ml de-ionized water; collophane (−106 + 75μ).

| Collophane Amount (g) | Residual Conc. of $Fe^{3+}$ (g/l) | Attenuation (%) |
|---|---|---|
| 0 | 4.97 | 0 |
| 1.0 | 1.9 | 61.8 |
| 2.0 | 0.01 | 99.8 |
| 3.0 | 0.01 | 99.8 |
| 5.0 | 0.00 | 100.0 |

3. Effect of Solids Concentration.

Solids concentration was also examined in the presence of 1.0 g collophane (Table 18). As presented in Table 18, attenuation is essentially independent of solids concentration.

TABLE 18

Effect of solids concentration.
Conditions: 200 g wet ore (−12.5 mm); 1.0 g collophane (−106 + 75μ); 24 hours conditioning time.

| Solids Conc. (%) | Initial $Fe^{3+}$ Conc. (g/l)* | Residual Conc. (g/l) | Attenuation (%) |
|---|---|---|---|
| 19.74 | 0.53 | 0.19 | 64.2 |
| 40.00 | 1.44 | 0.53 | 63.2 |
| 68.72 | 4.97 | 1.90 | 61.8 |

*Determined with water-wash of solids.

Example 9
Adsorption of Arsenic on Collophane.

1. Bio-oxidized Ore.

200 g of wet ore and 75 ml of de-ionized water were placed into a plastic bottle. Then 5.0 g of collophane (−104+74μ) was added, and the bottle was turned for 24 hours. Initial arsenic concentration was 119.35 mg/L. The residual solution contained 1.08 mg/l arsenic.

2. Arsenate Solution.

TABLE 19

Effect of $Fe^{3+}$ on adsorption of arsenate onto collophane.
Conditions: pH 2.00; initial concentration of As 105.60 ppm; 5.0 g collophane; 100 ml solution
different amount of $Fe_2(SO_4)_3$; agitation for 24 hours.

| $Fe^{3+}$ Conc. (ppm) | As Conc. (ppm) | Attenuation (%) |
|---|---|---|
| 0 | 106.68 | 0 |
| 100 | 101.3 | 4.07 |
| 500 | 89.74 | 15.02 |

Example 10
Comparison Between Collophane and Apatite.

A comparison of the attenuation obtained with collophane and with naturally occurring apatite has been conducted using 1 g of mineral (−104+74μ); 100 ml solution; 1 hour conditioning time; 24° C. The specific surface areas of the two materials were measured; collophane has about 1,000 times more surface area than apatite.

1. At pH 5.0, 1 g of apatite attenuated about 50 percent of the dissolved uranium. One g of collophane attenuated 99.7 percent of the dissolved uranium.

2. At pH 2.5, 1 g of apatite attenuated about 75 percent of the dissolved lead. One g of collophane attenuated about 95 percent of the dissolved lead.

3. At pH 2.3, 1 g of apatite attenuated about 10 percent of the dissolved ferric ion. One g of collophane attenuated about 90 percent of the dissolved iron.

TABLE 20

Comparison of Collophane with Apatite

| Mineral | Deposit | Size, $\mu$ | Specific Surface Area $M^2/g$ |
|---|---|---|---|
| Apatite | Canada | −147 + 104 | 0.17 |
| Collophane | Florida | −147 + 104 | 10.85 |

| Element | Result | Apatite | Collophane |
|---|---|---|---|
| Uranium (pH 5.0) | Initial Conc., ppm | 70 | 70 |
| | Residual Conc., ppm | 32.5 | 0.2 |
| | Attenuation, % | 53.6 | 99.7 |
| Lead (pH 2.5) | Initial Conc., ppm | 656 | 656 |
| | Residual Conc., ppm | 174.7 | 35.0 |
| | Attenuation, % | 73.4 | 94.7 |
| Iron (pH 2.3) | Initial Conc., ppm | 488 | 488 |
| | Residual Conc., ppm | 450 | 52 |
| | Attenuation, % | 7.8 | 89.3 |

The preceding examples are set forth to illustrate the principles of the invention, and specific embodiments of operation of the invention. The examples are not intended to limit the scope of the method. Additional embodiments and advantages within the scope of the claimed invention will be apparent to one of ordinary skill in the art.

We claim:

1. A method for removing a selected heavy metal ion from an aqueous solution, said method comprising:
   contacting said solution with collophane at a pH effective for capture of said selected heavy metal ion by said collophane.

2. The method of claim 1 wherein said pH is an acidic pH.

3. The method of claim 1 wherein said pH is a neutral to acidic pH.

4. The method of claim 1 wherein said heavy metal ion is selected from the group consisting of antimony, arsenic, cadmium, chromium, cobalt, copper, iron, lead, manganese, mercury, uranium and zinc ions.

5. The method of claim 1 wherein said heavy metal ion is $Fe^{3+}$.

6. The method of claim 1 wherein said heavy metal ion is $Pb^{2+}$.

7. The method of claim 1 wherein said heavy metal ion is $Hg^{2+}$.

8. The method of claim 1 wherein said heavy metal ion is $(UO_2^{2+}$.

9. The method of claim 1 wherein said heavy metal ion is $As^{3+}$ and $Fe^{3+}$ is also present in said solution.

10. The method of claim 1 wherein said collophane is contacted with said solution by adding said collophane to said solution.

11. The method of claim 1 wherein said collophane is contacted with said solution by passing said solution through said collophane.

12. The method of claim 1 wherein said collophane is contacted with said solution by mixing said collophane with a wet slurry comprising said solution.

13. The method of claim 1 wherein said solution is a drainage solution from a mine.

14. The method of claim 1 wherein said solution is a bio-oxidation solution from a gold or copper recovery process.

15. The method of claim 1 wherein said aqueous solution comprises said selected heavy metal ion and a second heavy metal ion, and said selected heavy metal ion is selectively removed from said solution by contacting said solution with collophane at a pH suitable for removal of said selected heavy metal ion but not for removal of said second heavy metal ion.

16. The method of claim 15 wherein said pH is at most about 3.5.

17. The method of claim 15 wherein said pH is at least about 6.5.

18. The method of claim 15 wherein said selected heavy metal ion is selected from the group consisting of $Pb^{2+}$, $Fe^{3+}$, $As^{3+}$ and $Hg^{2+}$, and said second heavy metal ion is selected from the group consisting of $Cd^{2+}$, $UO_2^{2+}$, and $Zn^{2+}$.

19. The method of claim 15 wherein said selected heavy metal ion is $Fe^{3+}$.

20. The method of claim 15 wherein said selected heavy metal ion is $UO_2^{2+}$.

* * * * *

UNITED STATES PATENT AND TRADEMARK OFFICE
CERTIFICATE OF CORRECTION

PATENT NO. : 5,910,253

DATED : June 8, 1999

INVENTOR(S) : Fuerstenau et al.

It is certified that error appears in the above-indentified patent and that said Letters Patent is hereby corrected as shown below:

In column 7, line 33, in Table 3, left hand column, delete "-147 + 105" and replace with -- -147 + 104--.

In column 8, line 12, in the title of Table 5, insert --mg/l; 100-- between "120" and "ml".

In column 10, lines 33 and 34, delete "Preferabiy" and replace with --Preferably--.

In column 11, line 37, Table 15, in the row beginning with "-8.00 + 3.35", delete "14.22" in the second column and replace with --318.60-- and delete "1.43" in the third column and replace with --32.00--.

In column 14, line 6, claim 8, delete the parenthesis preceding "$UO_2^{2+}$".

In column 14, line 38, claim 18, insert --$Cu^{2+}$,-- between "consisting of" and "$Cd^{2+}$".

Signed and Sealed this

Second Day of November, 1999

Attest:

Q. TODD DICKINSON

*Attesting Officer*   *Acting Commissioner of Patents and Trademarks*